(12) United States Patent
Kunstmann

(10) Patent No.: US 6,360,526 B2
(45) Date of Patent: Mar. 26, 2002

(54) ROCKET MOTOR WITH DESENSITIZER INJECTOR

(75) Inventor: John F. Kunstmann, King George, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/864,828

(22) Filed: May 24, 2001

Related U.S. Application Data

(63) Continuation-in-part of application No. 09/477,149, filed on Jan. 4, 2000, now abandoned.

(51) Int. Cl.$^7$ ............................................... F02K 9/38
(52) U.S. Cl. ........................ 60/223; 102/290; 102/481
(58) Field of Search ............................. 60/39.091, 223, 60/253, 254; 102/290, 481

(56) References Cited

U.S. PATENT DOCUMENTS

| | | | |
|---|---|---|---|
| 2,949,009 A | * 8/1960 | D'Ooge | 60/223 |
| 3,090,197 A | * 5/1963 | Lapp et al. | 60/223 |
| 4,172,421 A | 10/1979 | Regalbuto | 102/20 |
| 4,404,911 A | 9/1983 | Bell | 102/221 |
| 5,035,181 A | 7/1991 | Jacks et al. | 102/481 |
| 5,101,731 A | * 4/1992 | Adams | 102/290 |

* cited by examiner

Primary Examiner—Louis J. Casaregola
(74) Attorney, Agent, or Firm—James B. Bechtel, Esq.; John P. McMahon, Esq.

(57) ABSTRACT

A rocket motor having a desensitizing mechanism for preventing explosion or violent reaction during slow cook-off is provided. The rocket motor includes a case contained rocket propellant with a desensitizing assembly attached forward of the propellant charge. The desensitizing assembly is formed with an enclosure containing a desensitizing fluid, and connected to the interior of the rocket motor by a tube which is sealed by a heat sensitive plug. The heat sensitive plug melts at a temperature below the slow cook-off temperature of the rocket propellant. The melting of the plug allows the desensitizing fluid to be ejected into the interior of the casing and onto the propellant charges, thereby, desensitizing the propellant charge.

3 Claims, 2 Drawing Sheets

ROCKET MOTOR WITH DESENSITIZER INJECTOR

This is a CIP of application Ser. No. 09/477,149; Jan. 4, 2000 (abandoned).

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention described herein relates to solid fuel rocket motors and in particular to rocket motors having desensitizing safety features.

BACKGROUND OF THE INVENTION

According to Military Standard 2105B, HAZARD ASSESSMENT TESTS FOR NON-NUCLEAR MUNITIONS, no munition which is subjected to a slow heating, referred to in the standard as "slow cook-off", may have a reaction greater than a Type V reaction. This reaction is described in the standard as follows: "The energetic material ignites and burns non-propulsively. The case may open, melt or weaken sufficiently to rupture nonviolently, allowing mild release of combustion gases. Debris stays mainly within the area of the fire. This debris is not expected to cause fatal wounds to personnel or be hazardous fragment beyond 15 m (49 ft)." In the prior art, venting of various munitions has been accomplished by sealing the munition with a meltable material, such as nylon. Other mechanical venting methods are also known. For example, U.S. Pat. No. 5,035,181, Tacks et al describes a pop off for the fuze to lessen the cook-off hazard. Other types of munitions have used desensitizing fluids to inert a munition until a short time prior to arming. An example of such a munition is the small bagged packets of anti-personnel munitions which are carried in an aircraft canister filled with freon. Upon discharge from an aircraft, the small bags scatter around the target rapidly drying. Once dry, the munition is highly sensitive and will detonate upon any disturbance. Various venting, both mechanical and melting types have been applied to rocket motors. Likewise, various desensitizing means have been applied. However, no prior art method meets the Type V burning standard for slow cook-off of rocket motors. A need exists for a means of desensitizing a rocket motor fuel at the time of an inadvertent slow cook-off.

SUMMARY OF THE INVENTION

Accordingly, it is an object of the invention to provide a solid fuel rocket motor having non-energetic reaction characteristics when subjected to slow cook-off.

It is a further object of the invention to provide a solid fuel rocket motor that is ready to operate, but retains the insensitivity characteristics.

It is another object of the invention to provide a solid fuel rocket motor that is de-energized by a desensitizing fluid in the event of slow cook-off.

It is yet another object of the invention to provide a solid fuel rocket motor with a desensitizing unit which requires no external inputs (self-contained).

The invention is an enclosure that is connected via a tube to the interior of a solid fuel rocket motor. In one embodiment, a plug made from a material having a low melting point seals the connecting tube between the enclosure and the interior of the solid fuel rocket motor. The melting point of the plug material is chosen so that it is below the expected cook-off temperature of the particular rocket. The enclosure has a fill port that is sealed by a cap. The enclosure contains a fluid that will desensitize the solid rocket fuel when the two materials come into contact. In normal storage, or in ready deployment, the desensitizing fluid within the enclosure is separated from the propellant charge and has no effect on the rocket motor. If however, the rocket motor is subjected to slow cook-off, the meltable plug melts, turning into a liquid. The liquidized plug, along with the desensitizing fluid is now forced down the connecting tube and into the interior of the solid fuel rocket motor by pressure generated within the enclosure. The pressure, in one embodiment, in the enclosure is generated by compressed gas. In another embodiment, a spring driven piston pressurizes the desensitizing fluid. In operation, the desensitizing fluid contacts the solid rocket fuel, degrading its energetic qualities. When the cook-off temperature of the rocket is reached, the degraded propellant reacts much more slowly, meeting the Type V reaction requirement. During normal operation, that is, without any cook-off conditions being realized, of the rocket motor the desensitizing fluid will not come into contact with the solid fuel within the rocket motor. This is because during normal conditions, there will not be enough time for the plug to melt during the function time of the rocket, and also the pressure generated in the interior of the rocket motor will prevent any fluid flowing from the enclosure finding its way into the interior of the rocket motor.

In general, the desensitizer unit forms part of a rocket motor assembly and with the rocket motor thereof capable of experiencing a cook-off condition having a temperature within a first predetermined range. The rocket motor has a rocket case having a forward end, an exhaust end, and an interior in which a propellant charge capable of being desensitized is located. The desensitizer unit comprises:

(a) an enclosure having an exit port and a fill port;
(b) a cap which seals the fill port;
(c) a fluid located in the enclosure and comprised of a composition capable of desensitizing the propellant charge;
(d) a plug placed in the exit port of the enclosure and having a melting point at a second predetermined temperature range which is less than the first predetermined temperature range; and
(e) a tube connecting the exit port of the enclosure to the forward end of the rocket case.

In operation, when the rocket motor experiences the cook-off condition, the plug has already melted and opened the exit port to allow the desensitizing fluid to flow down the tube into the rocket case so that the propellant charge is desensitized.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1A:
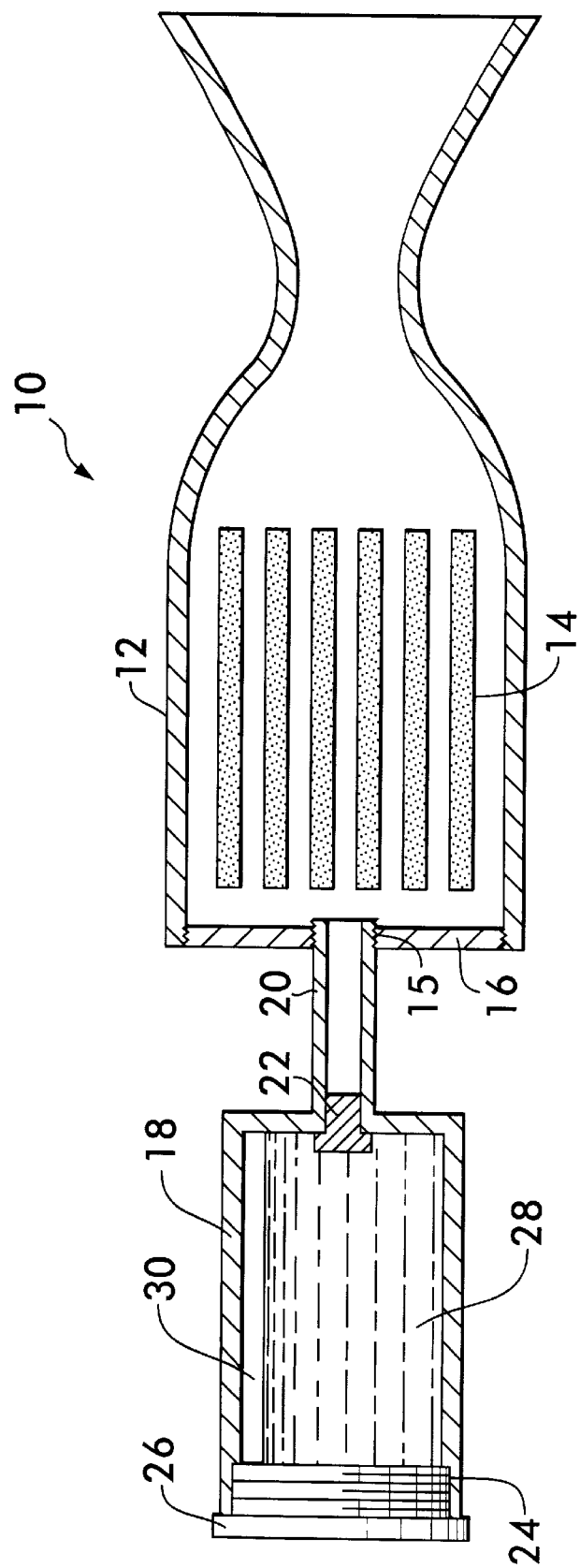
FIG. 1(A) is a side view of a rocket motor, of one embodiment, having an enclosure containing desensitized fluid attached thereto and shown in a partial cross-section.

Referring now to FIG. 1(A), the rocket motor, designated generally by the reference numeral 10, is shown with its major components. The rocket motor 10 comprises a case 12 containing a propellant charge 14. The casing 12 is engaged to a bulkhead 16 in a threaded manner forward of the propellant charge 14. As described herein, the bulkhead 16 is considered to be part of the rocket motor 10. The rearward or exhaust end of the rocket motor 10 is to the right in FIG. 1(A), as well as the other illustrations of the rocket motor 10 of FIG. 1(B) to be later described herein.

An enclosure 18 is connected to the rocket motor 10, in particular to the bulkhead 16 of the rocket motor 10, by a tube 20. In the embodiment of FIG. 1(A), male threads on the end of the tube 20 mate with female threads in a port in the bulkhead 16 so as to provide a retainer-fitting therebetween. The end of the tube 20 passes through the bulkhead 16 and into the interior of the case 12 of the rocket motor 10. The tube 20 is sealed between the enclosure 18 and the interior of the case 12 by a plug 22. The plug 22 is made from a material such as having a melting point below the expected cook-off temperature of the propellant charge 14. For example, for a cook-off temperature in the range from between about 300° F. to 350° F., the melting temperature selected for the plug 22 is in the range from about 200° F. to about 250° F.

The enclosure 18 has a fill port 24 that is sealed by a cap 26. The enclosure 18 contains a fluid 28 that is known to desensitize the propellant 14. The enclosure 18 is pressurized by compressed gas 30.

The operation of the invention occurs when the rocket motor 10 is subjected to slow cook-off condition. More particularly, the temperature of the interior of the rocket motor 10 disadvantageously increases because during slow cook-off, that is, a condition in which the interior is slowly and continuously heated by an outside source, such as fire through an insulating barrier. The increased temperature in the interior of the rocket motor 10 is also experienced by the enclosure 18. At a temperature, such as 200° F., slightly below the cook-off temperature typical of 300° F. the propellant charge 14, the heat sensitive plug 22 melts. Once the plug 22 has melted, the compressed gas 30 inside the enclosure 18 forces the liquidized plug 22 and the fluid 28 down the tube 20 and into the interior of the case 12. Once inside the case 12, the fluid 28 contacts the propellant charge 14, desensitizing its energetic properties. Shortly thereafter (in a typical slow cook-off circumstance) the propellant 14 reaches cook-off temperature, but by that time the propellant charge 14 has already been desensitized and the ignition and burning is greatly attenuated. No explosion will occur and the ensuing reaction is non-energetic, not exceeding the specified Type V reaction.

The features and advantages of the present invention are numerous. For example, the desensitizing unit of the present invention is self-contained in its operation; that is, it does not require any input from external sources, such as, electronic control panels. The rocket motor 10 is fully active and ready for launch with the desensitizing assembly in place. Only in the event of a high temperature is the desensitizing fluid released. As a result, the safety feature of not achieving a Type V reaction is in place at all times and does not interfere with the normal function of the rocket motor 10. In the unwanted event of a slow cook-off environment, however, the rocket propellant is desensitized by the operation of the present invention immediately prior to cook-off temperature. The rocket motor 10, by the practice of the present invention safeguards itself only in the event of and just prior to a slow cook-off condition.

Numerous variations can be made within the scope of the invention and one of which may be further described with reference to FIG. 1(B).

Figure 1B:
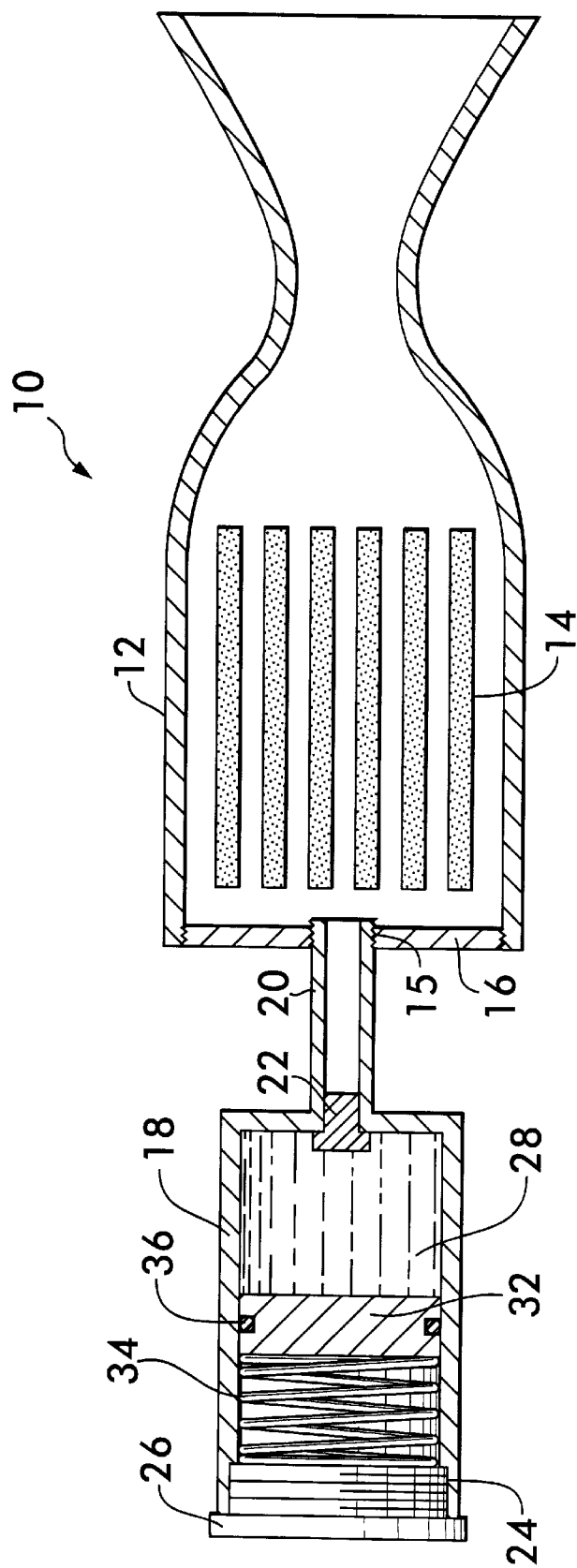
FIG. 1(B) illustrates another embodiment, wherein the pressure within the enclosure is elevated by a piston-spring arrangement.

FIG. 1(B) illustrates an arrangement quite similar to that of FIG. 1(A), with the exception that the pressure within the enclosure 18 is increased by the use of a piston 32 which is forced against the fluid 28 by a compressed spring 34, and is sealed by the O-ring 36. When the plug 22 is melted, the spring 34 drives the piston 32 into the enclosure 18, forcing the liquidized plug 22 and the fluid 28 down the tube 20 and into the interior at the case 12.

It should be appreciated that the different features illustrated and described with reference to FIG. 1(B), may be incorporated into the embodiment of FIG. 1(A).

Although the invention has been described relative to specific embodiments thereof, there are numerous variations and modifications that will be readily apparent to those skilled in the art in the light of the above teachings. It is therefore to be understood that, within the scope of the appended claims, the invention may be practiced other than as specifically described.

What I claim is:

1. A desensitizer unit forming part of a rocket motor assembly and with the rocket motor thereof capable of experiencing a cook-off condition having a temperature within a first predetermined range, said rocket motor having a rocket case having a forward end, an exhaust end, and an interior in which a propellant charge capable of being desensitized is located, said desensitizer unit comprising:
    (a) an enclosure having an exit port and a fill port;
    (b) a cap which seals said fill port;
    (c) a fluid located in said enclosure and capable of desensitizing said propellant charge;
    (d) a plug placed in said exit port of said enclosure and having a melting point at a second predetermined temperature range which is less than said first predetermined temperature range; and
    (e) a tube connecting said exit port of said enclosure to said forward end of said rocket case;
    whereby when said rocket motor experiences said cook-off condition said plug has already melted and opened said exit port to allow said desensitizing fluid to flow down said tube into said rocket case so that said propellant charge is already desensitized.

2. The desensitizer unit according to claim 1, wherein said enclosure is pressurized by compressed gas which forces said fluid down said tube when said plug melts.

3. The desensitizer unit according to claim 1, wherein said enclosure further comprises a piston driven by a compressed spring, said piston forcing said fluid down said tube into said rocket case when said plug melts.

* * * * *